United States Patent Office

3,840,670
Patented Oct. 8, 1974

3,840,670
CONDENSED FERMENTED WHEY ANIMAL FEED PRODUCT AND METHOD
William R. Holt, Clear Lake, Iowa, assignor to Fermented Products, Inc., Mason City, Iowa
No Drawing. Filed Mar. 1, 1972, Ser. No. 230,943
Int. Cl. A23k 1/00, 1/08
U.S. Cl. 426—41        5 Claims

ABSTRACT OF THE DISCLOSURE

Whey is cultured with *Lactobacillus bulgaricus* and *Lactobacillus acidophilus,* condensed, agitated and then combined with corn germ meal with which it is fermented. The combined fermented product is then aerated, cooled and cured to provide a non-hygroscopic, free-flowing, self-preserving animal feed component.

CROSS-REFERENCES

None.

FIELD

This invention relates to animal feed and to a process for producing same and more particularly relates to a non-hydroscopic, free-flowing, self-preserving animal feed component comprising a combination of corn germ meal fermented with condensed product of fermented whey with a selected Lactobacillus.

PRIOR ART

Culturing of whey is described in such patents as 1,554,913; 1,555,246; 1,561,158; 1,845,961; 2,465,905; and 3,497,359.

The need for providing free-flowing, non-caking, non-hygroscopic feed materials has been heretofore recognized as indicated in Pats. 3,475,177; 3,505,073; and Re. 25,337 wherein there are described various types of feed products formulated in non-hygroscopic form.

Corn germ meal has been used heretofore as a carrier for liquid feed ingredients but generally it has been considered equivalent to other carriers or has been used in conjunction with other carriers. It has been considered equivalent to other inexpensive ingredients suitable as carriers. Its use to provide a synergistic product when treated in accordance with the herein described process has not been described heretofore.

SUMMARY

An animal feed is produced which has numerous advantages. A major advantage is that the feed product is non-hygroscopic, non-setting, non-caking, and free-flowing. Another advantage is that it is self-preserving; that is, it has an extended shelf life and does not mold or otherwise deteriorate when stored under conditions of high humidity and high temperatures. Another advantage is that a product is provided which has a high live Lactobacillus count.

The animal feed component product produced in accordance with this invention comprises the product of fermenting corn germ meal with condensed cultured whey. The condensed cultured whey itself is produced by fermenting whey with *Lactobacillus bulgaricus* or *Lactobacillus acidophilus* and then condensing to 40% to 52% solids.

The product contains at least about 10% lactic acid, 20% lactose, less than 12.5% moisture, at least 20% crude protein, less than 1.75% crude fat, less than 6% crude fiber and less than 5.5% ash.

To produce said product, whey is fermented with *Lactobacillus bulgaricus* or *Lactobacillus acidophilus* or both, at 80° F. to 130° F. until its pH reaches 3.4 to 3.8.

The fermented whey is condensed by evaporation under vacuum to a solids content of 40% to 50% by weight. After condensing the product may be held in master culturing vats to fortify the Lactobacillus fermentation.

Then agitation as described below is carried out to provide a stabilized consistency.

The fermented condensed whey product from such agitation is then blended with corn germ meal and dried to a moisture content of 12% to 14% at a low temperature. Fermentation takes place during the blending and drying.

The blended dried fermented product is then aerated, cooled and cured to provide a temperature below 60° F. or 80° F. and a moisture content below 12.5% to provide the finished product.

ADVANTAGES

The feed product of the invention when fed in accordance with a suitably designed feeding program as a supplement to other feed has many advantages in feeding of swine, dairy, beef and poultry. It substantially increases the palatability of any feed for feeding to any livestock. The following remarks relate to results achieved when the product of the invention is added in proper amount as a feed additive concentrate to a feed additive premix or feed additive supplement which in turn is added to other ingredients to provide a complete feed.

In feeding swine: it serves as a digestive regulator and it increases water consumption of the animals. It helps eliminate gut edema. It improves feed utilization (conversion). Due to the high lactic acid content it maintains a parasite free condition in the intestines after worming and it eliminates nutritional scour problems.

In the case of dairy cattle, it raises depressed butter fat levels of milk produced and increases milk production. It reduces ketosis and the high lactic acid content compensates for poor forage. As with swine, it prevents nutritional scours and stops nutritional scours if they have existed prior to initiating feeding of the product and it increases water consumpton.

In the case of beef cattle, it gives a bloom to the hair coat similar to that produced by feeding linseed oil. As with swine and dairy, it improves digestion and improves food utilization (conversion) and makes possible the use of economical high urea concentrates in rations containing low energy forages.

In the case of poultry, it provides advantages which are common to feeding of all livestock such as aiding in feed utilization, water consumption and the like. It promotes increased growth and fast feathering and generally eliminates wet dropping in cage houses. Observations have been made that it is effective in curtailing coccidiosis. It may be used to replace 1 to 2 points of protein in a ration and according to Dr. Balloun, University of Iowa, it provides greater weight gain on less feed than other rations which may be fed to poultry.

OBJECTIVES

It is therefore an object of the invention to provide an improved animal feed component.

Another object is to provide an animal feed component having the above described advantages.

Other objects will become apparent from the following detailed description in which it is intended to illustrate the invention and to describe the invention without limiting its scope to less than that of all equivalents which will be apparent to one skilled in the art.

DESCRIPTION

Whey which remains as a by-product of cheese making contains normally on the order of about 6–7% solids and generally about 6% or 6.5% solids and generally has a pH of between 6 and 7. It may be defined, for purposes of the present invention, as having a solids content of less than 10%. Such whey, which may be obtained as a by-product from the manufacture of Italian, cheddar or cottage cheese, may be used in the process of the invention.

To be utilized in the process of the invention it is necessary that the whey be substantially free of salts, particularly sodium chloride, caustics and other materials which produce a detrimental environment for the Lactobacillus.

Normally such whey contains a number of species of bacilli which were active during the manufacture of the cheese in the process from which the whey was obtained. More particularly, *Lactobacillus bulgaricus* or *Lactobacillus acidophilus*, or both, are usually present and whey of this sort is suitably used in the process. Alternatively sterilized whey may be used and may be inoculated with a suitable culture of *Lactobacillus bulgaricus* or *Lactobacillus acidophilus* or both. Generally, such whey when obtained from the cheese process and provided with such culture, either by inoculation or as a left-over from the cheese process, has a temperature of between 60° F. and 130° F. One preferred source of whey is obtained as a product of Italian cheese manufacture at a temperature of 115° F. to 118° F. Whey may be obtained from Cheddar production at a temperature as low as 100° F. or even 90° F. and from Cottage cheese or Italian cheese production at a temperature as high as 130° F.

The whey thus inoculated, is fermented in fermenting tanks for a period which generally depends on the ambient temperature. The fermenting is carried out until the pH is reduced to a maximum of 3.8 or preferably a maximum of 3.6 and a minimum of 3.4 and generally preferably on the order of 3.5. Accordingly, the fermenting may take as short as 24 hours when carried out at a relatively desirable temperature such as 120° F. In colder weather the temperature may drop throughout the fermenting and the process may take as long as two days during which the temperature may drop to 80° F. Generally satisfactory fermenting for the purpose of the invention may take place at from 130° F. to 80° F., it being critical only that the pH be reduced to within the previously stated limits of 3.4 to 3.8 or preferably 3.6.

The thus fermented product is then condensed to from 40% to 52% solids and preferably to from 45% to 50% solids by evaporation under vacuum. In a preferred embodiment condensation is first carried out under vacuum until the solids content reaches 20% in a suitable condenser. The product may then be transferred from the condenser to a finishing pan to complete the condensation and in this event, it is preferred to pre-heat the product after it leaves the condenser at 20% solids to a temperature of from 140° F. to 170° F. before the product is introduced to the finishing pan. Such pre-heating is carried out so as to preferably pasteurize the product to a degree sufficient to kill all or nearly all salomonellae which may be present. Such pasteurization or pre-heating may kill *Lactobacillus bulgaricus* or *Lactobacillus acidophilus* organisms which have not been previously rendered inactive by the lactic acid produced during fermentation due to the relatively high acidity of a pH of 3.4 to 3.8. The product, after such pre-heating and pasteurizing, may then be introduced to a conventional finishing pan wherein the solids content may be reduced to 40% to 52%.

In a preferred embodiment this material may be placed in master holding tanks and maintained at 90° F. to 102° F. or hotter in summer and may be inoculated with a culture of *Lactobacillus bulgaricus* and *Lactobacillus acidophilus*, or both, to replace organisms killed during pasteurization.

While maintained in said holding tanks the thus newly reinoculated product is agitated to provide further fermentation in some instances. Such agitation stabilizes the consistency and prevents or reduces subsequent settling of suspended solids and may be carried out in any one of a large number of manners such as by introduction to a high intensity mill. In a preferred embodiment it is carried out by pumping the product from the holding tank into a high pressure pump and thence through an orifice or piping system at high pressure and thence back into the tank. The material is thus circulated repeatedly for a sufficient number of cycles to obtain an effect similar to homogenization or an effect of at least partial homogenization. Depending on the equipment, such agitation or circulation may take place for from 5 minutes to an hour or more, the time being wholly non-critical; it being only preferred that such agitation be carried out until the tendency of solids to settle as determined by visual observation is reduced to an empirically determined minimum.

In other words, while such agitation is relatively critical and is preferred, the precise degree of agitation may vary greatly and in some instances relatively mild agitation may be sufficient.

In some instances, the product which leaves the finishing pan may have obtained a pH as high as 4.0 and during such agitation, by reason of the presence of the Lactobacillus introduced during the aforementioned reinoculation, further fermentation takes places to reduce the pH again to between 3.4 and 3.8 or preferably 3.6.

The Lactobacillus plate count per gram of the material then removed from the finishing pan may be on the order of 40 or 50 as indicated in Table I and does not exceed 60.

This product is now blended with corn germ meal and the blended product is dried. Generally preferably blending and drying are carried out simultaneously in a drier such as a rotating drum drier with forced hot air being introduced to and through the drum to accomplish drying, but alternatively all or a portion of the blending may be accomplished before drying is initiated. The material during blending and drying may be re-cycled through a continuous drum drier. The materials are added in such proportions as to provide preferably 50% of total solids as corn germ meal solids and 50% of total solids as condensed fermented whey product solids but suitably corn germ meal solids may constitute from 40% to 60% of total solids, the balance of total solids being condensed fermented whey product solids.

It is a critical feature of the blending and drying step that it is carried out at a relatively low temperature. Generally the product issuing from the drier has a temperature no greater than 105° F. although generally no lower than 100° F. The maximum temperature at the middle of the drum may, in certain instances, not exceed 130° F.; in certain other instances it may exceed 140° F. but in no event is the temperature of 150° F. allowed to be exceeded.

The purpose of providing a relatively low temperature during drying and blending is to facilitate the fermentation which takes place in the blended product as a result of the residual few remaining *Lactobacillus bulgaricus* or *Lactobacillus acidophilus* organisms present in the condensed fermented whey product prior to blending and as a result of the low number of Lactobacillus organisms present in the corn germ meal prior to blending as may be seen from Table I.

The drying and blending step is carried out with recycling of material through the drum drier until moisture content is reduced to 12% to 14%.

The blended dried product from the drier which has been somewhat fermented during the blending and drying is then aerated, cooled and cured to provide the final product. During the step of aeration, cooling and curing further fermentation may take place. Aerating may be accomplished by mechanically agitating the material in any suitable manner such as by conveying it from place to place with auger conveyors and elevator leg conveyors. After aerating, the material is delivered to a holding bin where it is held and cured for at least 4 hours. During aeration and cooling the temperature is reduced to a temperature which depends on the weather and may be as low as −20° F. in relatively cold weather. In warmer weather the temperature is preferably reduced at least as low as 60° F. or, operably, 90° F., and reduction to this temperature may be facilitated by carrying out a portion of the aeration of the product in a rotating drum drier with forced air being introduced thereinto.

During the step of aerating, cooling and curing, the moisture content is reduced to below 12.5% and preferably to on the order of 10%. While the material is cured in the aforementioned holding bin, some fermentation may take place and the product may somewhat agglomerate. The product remains in the holding bin for at least 4 hours and may remain for 8 or 12 hours. At the end of this time the product is mechanically removed from the bin and mechanical action in accomplishing such removal generally eliminates such agglomeration and provides a final granular product which may be immediately bagged or otherwise packaged or may be stored for any desired period of time and packaged later.

The final product has a relatively high lactobacillus plate count, as shown in Table I below, as a result of the fermentation which is carried out during the blending and drying step and which may be further carried out during the step of aerating, cooling and curing.

TABLE I

| Test | Corn germ meal | Finished product | Condensed fermented whey product after agitation—before blending |
|---|---|---|---|
| Aerobic Plate count per gram | | 10,000 | 40 |
| Mold count per gram | | 150 | 1 |
| Lactobacillus Plate count per gram | 350 | 6,500 | 50 |

NOTE.—The samples were diluted in sterile, buffered distilled water and aliquots from each dilution were plated upon Difco Plate Count Agar, Difco APT Agar, and acidified Potato Dextrose Agar. Total counts and Lactobacillus count were obtained after 48 hours at 35° C. Mold counts were obtained after 3 days at 26° C.

Whereas in the particular example represented by Table I the Lactobacillus count per gram after curing was 6,500, it is generally higher. It is preferably no lower than 5,000. Thus it may be seen that a relatively large number of live organisms principally or majorily consisting of Lactobacillus organisms are present in the cured product as compared with the relatively very small number of such organisms present in the ingredients just before they are blended as a result of the final fermentation step.

The final product thus produced may be mixed in various proportions with various animal feed ingredients to provide any one of a large number of animal feed supplement products for feeding beef, dairy, chickens, turkeys, swine, horses and the like.

The following analysis characterizes the final product produced as described above. In a sense this analysis may be described as a finger print of the final product since no other known product has a comparable analysis and the analysis characterizes one embodiment of the product. The analysis of other embodiments may vary from the following analysis and, therefore, although the analysis characterizes the product, it is not presented as a limiting definition of the product but as a characterization of the product as embodied in one instance which differs in characteristic manner from all other kown products.

TYPICAL ANALYSIS

Major items:
| | | |
|---|---|---|
| Crude protein (N x 6.25) | Percent | 20.40 |
| Crude fat (ether Extract) | do | 1.65 |
| Crude fiber-(maximum) | do | 5.85 |
| Moisture-(maximum) | do | 12.50 |
| Ash-(maximum) | do | 5.25 |
| Salt (NaCl) (equivalent) (maximum) | do | 1.56 |
| Calcium (Ca) | do | 0.60 |
| Phosphorus (P) | do | 0.78 |
| Potassium (K) | do | 1.20 |
| Sodium (Na) | do | 0.52 |
| Magnesium (Mg) | do | 0.21 |
| Carbohydrates (CHO) | do | 63.00 |
| Total digestible nutrients (TDN) (calculated by difference) | do | 77.00 |
| Metabolizable calories/lb. (calculated) (poultry) | | 800 |
| Lactic acid | percent | 10.00 |
| Lactose-(reducing sugar as Lactose) (Maximum) | do | 20.00 |
| Vitamin B-12 | Mcg./lb. | 7.80 |

Trace Elements: [1]
| | | |
|---|---|---|
| Iron (Fe) | Percent | 0.071 |
| Zinc (Zn) | do | 0.110 |
| Manganese (Mn) | do | 0.005 |
| Aluminum (Al) | do | 0.0018 |
| Copper (Cu) | do | 0.0014 |
| Chromium (Cr) | do | 0.00015 |

Proportions of amino acids [2] in total protein:

| | Parts by Weight |
|---|---|
| Arginine | 0.60 |
| Lysine | 0.58 |
| Methionine | 0.23 |
| Tryptophane | 0.14 |
| Glycine | 0.60 |
| Histidine | 0.26 |
| Threonine | 0.60 |
| Valine | 0.80 |
| Tyrosine | 0.41 |
| Phenylalanine | 0.52 |
| Leucine | 0.13 |
| Isoleucine | 0.59 |
| Proline | 0.96 |
| Serine | 0.64 |
| Glutamic Acid | 2.20 |
| Aspartic Acid | 1.10 |
| Alanine | 0.95 |

[1] Trace Elements determined by method of Jour. of the A.O.A.C., Vol. 51, No. 5, 1968, pp. 1003–1010.
[2] Amino acids determined by Amino Acid Analyzer except Tryptophane which was determined by method of Henderson and Snell, J. Biol. Chem. 172, 15 (1948).

Having thus disclosed my invention, I claim:

1. The process of producing a non-hygroscopic freely-flowable self-preserving animal feed component comprising a combination of whey cultured with a Lactobacillus selected from the group consisting of *Lactobacillus acidophilus* and *Lactobacillus bulgaricus* fermented with corn germ meal comprising the combination of the steps of:

first, providing a quantity of whey having less than 10% solids at 90° F. to 130° F., second, providing a culture of Lactobacillus in said quantity of whey to provide inoculated whey, said Lactobacillus selected from the group consisting of *Lactobacillus bulgaricus* and *Lactobacillus acidophilus* and mixtures thereof, third, maintaining said inoculated whey at 80° F. to 130° F. until its pH reaches 2.4 to 3.8, then, fourth, reducing the liquid content of the resultant cultured whey until it has a solids content of 40% to 52%, then subsequently, blending said product with corn germ meal to provide 40% to 60% of total solids as corn germ meal solids and drying to a moisture content of 12.0% to 14.0% at a maximum temperature of 150° F., and aerating and cooling and curing in a holding bin for at least 4 hours to provide a temperature below 60° F. and a moisture content below 12.5%.

and fermenting the product of the fourth step with said corn germ meal during at least a portion of the period during which said blending, aerating and cooling and curing steps are carried out to provide said non-hygroscopic freely-flowable self-preserving animal feed component.

2. The process of claim 1 wherein said maximum pH is 3.6.

3. The process of claim 1 characterized by carrying out the fifth step until the product thereof has a Lactobacillus plate count of less than 60 organisms per gram and by fermenting said product with said corn germ meal during at least a portion of the period during which said sixth and seventh steps are carried out until the Lactobacillus plate count exceeds 5000 organisms per gram.

4. The process of claim 1 wherein said fourth step is carried out until said solids content is 45% to 50%.

5. A non-hygroscopic free-flowing self-preserving animal feed component comprising the fermentation product of fermenting with a Lactobacillus selected from the group consisting of *Lactobacillus acidophilus* and *Lactobacillus bulgaricus* and mixtures thereof, a combination of corn germ meal with condensed product of fermenting whey with a Lactobacillus selected from the group consisting of *Lactobacillus acidophilus* and *Lactobacillus bulgaricus* and mixtures thereof, said self-preserving animal feed component further characterized by containing at least 10% lactic acid, less than 20% lactose and less than 12.5% moisture and having a Lactobacillus count of at least 5,000 Lactobacillus organisms per gram, said condensed product of fermenting whey having a Lactobacillus count of less than 60 Lactobacillus organisms per gram.

References Cited

UNITED STATES PATENTS 3,243,299   3/1966   Mecho et al. _____ 99—9 X

LIONEL M. SHAPIRO, Primary Examiner

U.S. Cl. X.R.

426—185

UNITED STATES PATENT OFFICE
CERTIFICATE OF CORRECTION

Patent No. 3,840,670      Dated October 8, 1974

Inventor(s) William R. Holt

It is certified that error appears in the above-identified patent and that said Letters Patent are hereby corrected as shown below:

Column 3, line 51, insert -- condenser -- before "to a finishing pan"; Column 5, line 75, change "kown" to -- known --; Column 8, line 15, after claim 5, insert the following claim:
-- 6. In the process of claim 1 of producing a non-hygroscopic freely-flowable self-preserving animal feed component comprising a combination of whey cultured with a Lactobacillus selected from Lactobacillus acidophilus and Lactobacillus bulgaricus fermented with corn germ meal comprising the combination of the steps of:
    first, providing a quantity of whey having less than 10% solids at 90°F. to 130°F.,
    second, providing a culture of Lactobacillus in said quantity of whey to provide inoculated whey, said Lactobacillus selected from Lactobacillus bulgaricus and Lactobacillus acidophilus,
    third, maintaining said inoculated whey at 80°F. to 130°F. until its pH reaches 3.4 to 3.8, then,
    fourth, evaporating the resultant cultured whey under vacuum until it has a solids content of 40% to 52%, then,
    fifth, agitating said product, then,
    sixth, blending said product with corn germ meal to provide 40% to 60% of total solids as corn germ meal solids and drying to a moisture content of 12.0% to 14.0% at a maximum temperature of 150°F., then,
    seventh, aerating and cooling and curing in a holding bin for at least 4 hours to provide a temperature below 60°F. and a moisture content below 12.5%,
and fermenting the product of the fifth step with said corn germ meal during at least a portion of the period during which said sixth and seventh steps are carried out to provide said non-hygroscopic freely-flowable self-preserving animal feed component. --
In the heading to the printed specification line 8, " 5 Claims" should read -- 6 Claims --.

Signed and sealed this 14th day of January 1975.

(SEAL)
Attest:

McCOY M. GIBSON JR.      C. MARSHALL DANN
Attesting Officer      Commissioner of Patents